(12) United States Patent
Corekin

(10) Patent No.: US 11,023,249 B1
(45) Date of Patent: Jun. 1, 2021

(54) FIRST STAGE BOOTLOADER (FSBL)

(71) Applicant: United States of America as represented by the Administrator of NASA, Washington, DC (US)

(72) Inventor: Jennifer A. S. Corekin, Odenton, MD (US)

(73) Assignee: United States of America as represented by the Administrator of NASA, Washington, DC (US)

(*) Notice: Subject to any disclaimer, the term of this patent is extended or adjusted under 35 U.S.C. 154(b) by 426 days.

(21) Appl. No.: 16/142,187

(22) Filed: Sep. 26, 2018

(51) Int. Cl.
| | |
|---|---|
| *G06F 9/4401* | (2018.01) |
| *G06F 11/10* | (2006.01) |
| *G06F 16/18* | (2019.01) |
| *G06F 16/17* | (2019.01) |
| *G06F 21/64* | (2013.01) |
| *G06F 11/14* | (2006.01) |
| *G06F 21/57* | (2013.01) |

(52) U.S. Cl.
CPC ........ *G06F 9/4401* (2013.01); *G06F 11/1004* (2013.01); *G06F 16/1734* (2019.01); *G06F 16/18* (2019.01); *G06F 11/1417* (2013.01); *G06F 21/575* (2013.01); *G06F 21/64* (2013.01)

(58) Field of Classification Search
CPC .... G06F 11/1417; G06F 21/575; G06F 21/64; G06F 8/654
See application file for complete search history.

(56) References Cited

U.S. PATENT DOCUMENTS

| | | | |
|---|---|---|---|
| 2005/0114391 A1* | 5/2005 | Corcoran | G06F 9/4401 |
| 2008/0229035 A1* | 9/2008 | Thayer | G06F 12/0607 |
| | | | 711/157 |
| 2014/0297998 A1* | 10/2014 | Kang | G06F 9/4401 |
| | | | 713/1 |
| 2016/0117225 A1* | 4/2016 | Yu | G06F 11/1417 |
| | | | 714/15 |
| 2017/0084088 A1* | 3/2017 | Reichardt | G05B 15/02 |
| 2017/0090909 A1* | 3/2017 | Guo | G06F 21/57 |
| 2018/0088614 A1* | 3/2018 | Choi | H03K 17/165 |
| 2018/0253556 A1* | 9/2018 | Karaginides | G06F 21/44 |

* cited by examiner

*Primary Examiner* — Jigar P Patel
(74) *Attorney, Agent, or Firm* — Heather Goo; Bryan A. Geurts; Helen M. Gaius

(57) ABSTRACT

The present invention relates to a method of reading images using redundant copies and recovery mechanisms to produce valid images, including: reading an OS boot table from a default location in at least one flash memory to at least one DDR SDRAM of a printed circuit board, using at least one processor connected to at least one FPGA; wherein the boot table describes where to find an OS image and a RAM filesystem image in the flash memory; reading a RAM filesystem image from the flash memory into the DDR SDRAM; and validating the boot table and the RAM filesystem image by checking them for corruption using header information and cyclic redundancy check methods; wherein when at least one of the OS image or the RAM filesystem image is corrupt, a valid image can be compiled using valid sections of each of the OS image or the RAM filesystem image.

15 Claims, 2 Drawing Sheets

FIRST STAGE BOOTLOADER (FSBL)

ORIGIN OF THE INVENTION

The invention described herein was at least in-part made by an employee of the United States Government and may be manufactured or used by or for the Government of the United States of American for governmental purposes without the payment of any royalties thereon or therefor.

CROSS REFERENCE TO RELATED APPLICATION

Reference is made to and the contents are hereby by incorporated by reference of non-provisional utility patent application entitled "DUAL DYNAMIC RANDOM (DDR) ACCESS MEMORY INTERFACE DESIGN FOR AEROSPACE PRINTED CIRCUIT BOARDS."

BACKGROUND OF THE INVENTION

1. Field of the Invention

The present invention relates to a novel first stage bootloader (FSBL) used in space applications. The FSBL provides functionality to read software images (i.e., NASA Restore-L images) from flash memory, using redundant copies and recovery mechanisms, if necessary, to produce valid images. It also communicates with a monitor field programmable gate array (FPGA) to support watchdogging and system logging.

2. Description of the Related Art

The present invention relates to endeavors in space applications, such as launching a robotic spacecraft to refuel a live satellite.

Currently, spacecraft launch into space with a finite amount of fuel, their lifespans restricted by the amount of propellant within their metal spacecraft buses at launch. Thus, a refueling capability in space by future propellant-delivery spacecraft, could provide satellite owners the ability to manage, maintain, and save their most valuable assets in space. With robotic servicing on the table, satellite owners can extend the lifespan of satellites that are running low on fuel, reaping additional years of service—and revenue—from their initial investment. If a solar array or a communications antenna fails to deploy, a servicer with inspection cameras and the right repair tools could help recover the asset that otherwise would have been lost.

Such spacecraft refueling missions could also help decrease the risk for future servicing ventures and establish a global precedence for safe rendezvous operations in orbit. Servicing capabilities could help satellite owners better manage their space assets in innovative ways. This could include launching a spacecraft with a half-empty fuel tank and allotting the saved weight to mission-specific instruments.

Prior art compact systems image and track the many visiting vehicles that journey to the space station each year. An existing Spacecube 2.0™ system contains three separate sensors that span multiple wavelengths, coupled with high-performance, reprogrammable avionics that process imagery. The vision processing and navigation algorithms convert the imagery collected by the sensors into an accurate relative navigation solution between the Spacecube 2.0™ and the space vehicle. The system also uses a two-axis gimbal to point its sensors at the space vehicle to increase the time it has to follow the space vehicle into docking or berthing.

Successful existing operations demonstrate that a similar system can be used to pilot a satellite-servicing vehicle to a client spacecraft, verifying a key technology for the spacecraft refueling servicing mission. Additionally, the existing systems demonstrate that a common specification on autonomous rendezvous and docking technologies—which means that a single set of hardware could meet the needs of multiple missions—can be achieved. This approach saves money over time, as it provides a standard specification that mission managers can order from, and that vendors can build to.

The prior art FSBL is an ISE2.0 based on a Xilinx® SREC bootloader code. SREC is a file format that conveys binary information in ASCII hex text form and is commonly used for programming flash memory in microcontrollers and programmable logic devices. This prior art version could read an SREC image from flash memory, read redundant copies of images, and utilize the flash mutex to synchronize flash usage between two processors sharing the same flash bank.

However, the prior art supported reading only one image from flash memory, and only in SREC format. It did not support watchdog stroking, meaning the watchdog had to be off during the boot process. It also did not support communication with the additional FPGA provided with the electronics (i.e., Aeroflex FPGA), which for the Restore program, provided a place to store boot log that was persistent across multiple boots.

Thus, the desire to improve the prior art version of the FSBL to boot as quickly as possible, to stroke the watchdog monitored by the FPGA, and to log the status of the boot process, in case the system failed to boot, is desired. An improved FSBL would also mitigate emission and cross-talk problems in three-phase motor drives, particularly for space applications.

SUMMARY OF THE INVENTION

The present invention relates to a novel first stage bootloader (FSBL) used in space applications. The FSBL provides functionality to read software images (i.e., NASA Restore-L images) from flash memory, using redundant copies and recovery mechanisms, if necessary, to produce valid images. It also communicates with a monitor field programmable gate array (FPGA) to support watchdogging and system logging.

In one embodiment, the present invention relates to a method of reading images using redundant copies and recovery mechanisms to produce valid images, including: reading an OS boot table from a default location in at least one flash memory to at least one DDR SDRAM of a printed circuit board, using at least one processor connected to at least one FPGA; wherein the boot table describes where to find an OS image and a RAM filesystem image in the flash memory; reading a RAM filesystem image from the flash memory into the DDR SDRAM; and validating the boot table and the RAM filesystem image by checking them for corruption using header information and cyclic redundancy check methods; wherein when at least one of the OS image or the RAM filesystem image is corrupt, a valid image can be compiled using valid sections of each of the OS image or the RAM filesystem image.

In one embodiment, a method of reading software images using redundant copies and recovery mechanisms, to produce valid images, includes: reading an operating system (OS) boot table from a default location in at least one flash memory to at least one double data rate synchronous dynamic random-access memory (DDR SDRAM) of a printed circuit board, using at least one processor connected to at least one field programmable gate array (FPGA); wherein the boot table describes where to find an OS image and a random-access memory (RAM) filesystem image in the at least one flash memory; reading a RAM filesystem image from the at least one flash memory into the DDR SDRAM; and validating the boot table and the RAM filesystem image by checking the boot table and the RAM filesystem image for corruption using header information and cyclic redundancy check methods; wherein when at least one of the OS image or the RAM filesystem image is corrupt, a valid image can be compiled using valid sections of each of the OS image or the RAM filesystem image.

In one embodiment, when one of the boot table or the RAM filesystem image is determined to be corrupt, the method further includes: reading a next copy from the at least one flash memory until a valid boot table is found.

In one embodiment, the method further includes: dividing the RAM filesystem image into sections to validate each of the sections using the header information and cyclic redundancy check methods, until a valid section is found.

In one embodiment, the method further includes: copying the valid section into a new copy of the RAM filesystem image.

In one embodiment, the method further includes: interpreting the OS image using an S-record interpreter.

In one embodiment, when an S-record in the OS image is corrupt, further including: reading remaining copies of S-records until a valid OS image is found.

In one embodiment, each S-record is interpreted individually.

In one embodiment, each S-record contains a portion of said OS image.

In one embodiment, when the S-record in said OS image is corrupt, further including: copying a valid section of the OS image from the S-record into an OS image at a location in DDR SDRAM defined by the S-record.

In one embodiment, when the valid image is obtained, further including: logging where each copy of the OS image and the RAM filesystem image are stored in the DDR SDRAM.

In one embodiment, the method further includes: moving a counter to a start of the operating system; and launching the operating system using a start address located in the DDR SDRAM defined by the S-record.

In one embodiment, the method further includes: stroking a monitor FPGA to indicate that processors located with the at least one FPGA are operating; and ordering a reset if the processors are not operating.

In one embodiment, the method further includes: coordinating reads from one or more flash memories by said processors.

In one embodiment, the method further includes: reducing an operation voltage of the printed circuit board by using a plurality of DDR SDRAMs.

In one embodiment, the at least one voltage regulator or Buck converter reduces the operation voltage.

In one embodiment, the method further includes: using internal scrubbing and error correction and detection (EDAC) methods to correct errors in processing operations of the printed circuit board.

Thus, has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawing is only one exemplary embodiment of the disclosure and not to be considered as limiting in scope.

DESCRIPTION OF THE INVENTION

The present invention relates to a novel first stage bootloader (FSBL) used in space applications. The FSBL provides functionality to read software images (i.e., NASA Restore-L images) from flash memory, using redundant copies and recovery mechanisms, if necessary, to produce valid images. It also communicates with a monitor field programmable gate array (FPGA) to support watchdogging and system logging.

In particular, the present invention relates to endeavors in space applications, such as launching a robotic spacecraft to refuel a live satellite. The satellite-servicing technology of the present invention includes servicing satellites in low-Earth orbit (LEO)—a first-of-its-kind mission. The satellite may be, for example, the Landsat 7, a government-owned satellite in low-Earth orbit, and the like. The present invention introduces new ways to robotically manage, upgrade and prolong the lifespans of costly orbiting spacecraft. By doing so, the present invention provides expanded options for more resilient, efficient and cost-effective operations in space.

Figure 1:
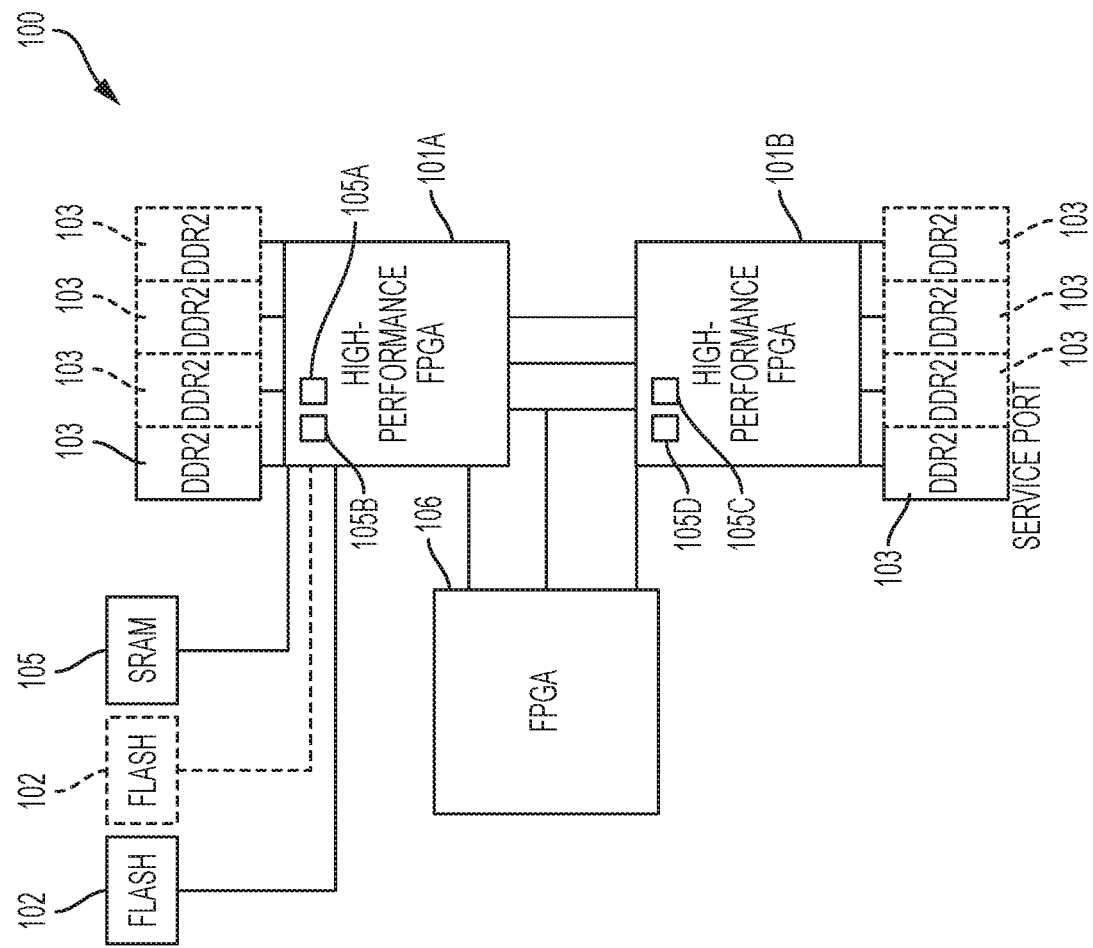
FIG. 1 is a schematic diagram of a top layout of a radiation-hardened single board computer system, useful for space applications, according to one embodiment consistent with the present invention.

In one embodiment, the First Stage Bootloader (FSBL) of the satellite-servicing technology of the present invention is used with the Spacecube 2.0™, which utilizes at least one cross-cutting, in-flight reconfigurable Field Programmable Gate Array (FPGA) 100A, 100B based on-board hybrid science data processing system 100 (see FIG. 1). In one embodiment, the Spacecube 2.0™ hardware contains two processing slices, each with a monitor FPGA 104 (i.e., an Aeroflex FPGA or the like), and two data processing FPGAs 101A, 101B (i.e., Xilinx Virtex-5 or the like). The Spacecube 2.0™ provides 10× to 100× improvements in on-board computing power while lowering relative power consumption and cost.

Although the embodiments disclosed herein will be described with reference to the drawings, it should be understood that the embodiments disclosed herein can be embodied in many alternate forms. In addition, any suitable size, shape or type of elements, components, or materials could be used.

In one embodiment, the FSBL of the present invention is used with a single board computer system 100 (see FIG. 1), which includes at least one extremely small, low power, reconfigurable field-programmable gate array (FPGA) multi-processor system—one on the top side (FPGA 101A) and one on the bottom side (FPGA 101B)—such as a Xilinx Virtex-5, or the like, suitable for space flight. In one embodiment, the FPGA 101A, 101B of the printed circuit board 100 of the present invention is a high-performance radiation-hardened reconfigurable FPGA 100A, 100B for processing computation-intensive space systems. While embodiments of the present invention are generally described with respect to the FPGA 100A, 100B, they are no so limited, and any suitable reconfigurable processor that meets the desired strict size, weight, processing capability and power requirements, can be implemented in the single board computer system 100.

In one embodiment, peripheral components or devices that are used with the single board computer system 100 are chosen to maximize the use of the system 100 with a small electronics or printed circuit board 100 and are not discussed in detail herein.

As shown in FIG. 1, which illustrates one side of the single board computer system 100, the major components of the system 100 include at least one flash memory device 102, such as a 32 Gb flash memory for holding the software application and other user data. In one embodiment, there is a flash memory device 102 (i.e., such as a 3D PLUS 64 Mb Flash device) on each of the top and bottom of the printed circuit board 100.

In one embodiment, the single board computer system 100 includes at least one double data rate synchronous dynamic random-access memories (DDR SDRAMs) 103 (such as ISSI® DDR1 SDRAMs, or DDR2 SDRAMSs or the like, suitable to extend the life of the system 100 and provide even greater memory throughput to support the next generation of instruments.

In one embodiment, the single board computer system 100 includes one DDR SDRAM 103, but may include up to four DDR SDRAM memories 103 in pairs with shared address/command/control lines, and a shared clock. In one embodiment, the DDR SDRAM random-access-memories 103 includes two sets of 4×DDR2 SDRAM 2 Gbit (×16) memories 103 connected to the FPGA 101A (top side) and the FPGA 101B (bottom side). In other words, four 2 Gbit DDR2s SDRAMs 103 on each of the top side and on the bottom side of the board 100 for a total of 8 DDR2 SDRAMs 103, (although only at least one DDR SDRAM on each side can be used), for storing an operating system and dynamic application data such as images or attached instrument data, for example.

In one embodiment, the FSBL of the present invention runs two processors 105A, 105B and 105C, 105D (i.e., Microblaze processors or the like) on each data processing FPGA 101A, 110B. In one embodiment, the present invention includes one flash memory bank 102 for each FPGA 101A, 101B shared between the two processors 105A, 105B and 105C, 105D, respectively, and use is arbitrated by a hardware mutex, which prevents concurrent access to the processors 105A-105D.

In one embodiment, the interfaces between the main components of the single board computer system 100 accomplish the functions of the present system 100. In one embodiment, DDR SDRAMs 103, flash memories 102 and SRAM 106 are connected to FPGA 101A, and the other DDR SDRAMs 103 are connected to the FPGA 101B. Both FPGAs 101A, 101B are connected to each other, and to monitor FPGA 104, as well as to peripheral components not described herein, but are generally described in U.S. Pat. No. 9,851,763, which is herein incorporated by reference in its entirety.

In one embodiment, radiation mitigation is possible with the single board computer system 100 of the disclosed embodiment, by using radiation-hardened parts and components. In one embodiment, the software and data files in the flash memory can be stored in a redundant fashion to protect against radiation upsets. In one embodiment, the single board computer system 100 is reconfigurable via a "hardware bootloader".

In one embodiment, the FSBL of the present invention is a light-weight program to read the operating system (OS) out of flash memory 102 and launch it on FPGA 101A, 101B initialization for the satellite servicing or refueling mission. More specifically, the First Stage Bootloader (FSBL) of the present invention, reads the processor's 105A-105D software images from flash memory 102, utilizing redundant copies of the images if necessary, and launches the operating system (OS). The system 100 will store several copies of each file in flash memory 102, greatly reducing the probability that radiation events will render the user unable to read a given file from flash memory 102.

The FSBL of the present invention is a C program, written as standalone code with no OS support. It runs from block random access memory (BRAM) when an FPGA 101A, 101B is loaded, or when the FPGA 101A, 101B is reset. It runs on every processor 105A-105D until it hands off execution to the OS.

The FSBL software of the present invention loads flight software in two parts: 1) the main operating system (OS) image, which contains the Free Real-Time Operating System (FreeRTOS) kernel (i.e., provides timely and deterministic response to events, and responsible for task management, inter-task communication and synchronization) and Core Flight Executive (cFE) (i.e., a component of the Core Flight System, a platform and project independent reusable software framework and set of reusable software applications for space flight), in Motorola S-record (SREC) format; and 2) the random access memory (RAM) 103 (i.e., ISI® DDR2 SDRAMs or the like) filesystem image, which contains cFE-based application libraries, in memory file system (MFS) format, with a custom header added. In one embodiment, both parts must be read from flash memory 102 (such as a 32 Gb flash memory for holding the software application and other user data), into the correct locations in the double data rate synchronous dynamic random-access memory or memories (DDR SRAM(s) 103), in order for the flight software to be fully operational.

In one embodiment, both the OS and the DDR SRAM(s) 103 are necessary for the main software program to execute, so this application is responsible for finding a valid copy of each in flash memory, using the file headers and checksums to validate each image. If none of the copies are fully valid, the program will attempt to construct a fully valid image by validating the images in small sections and piecing together validated sections from multiple copies.

Figure 2:
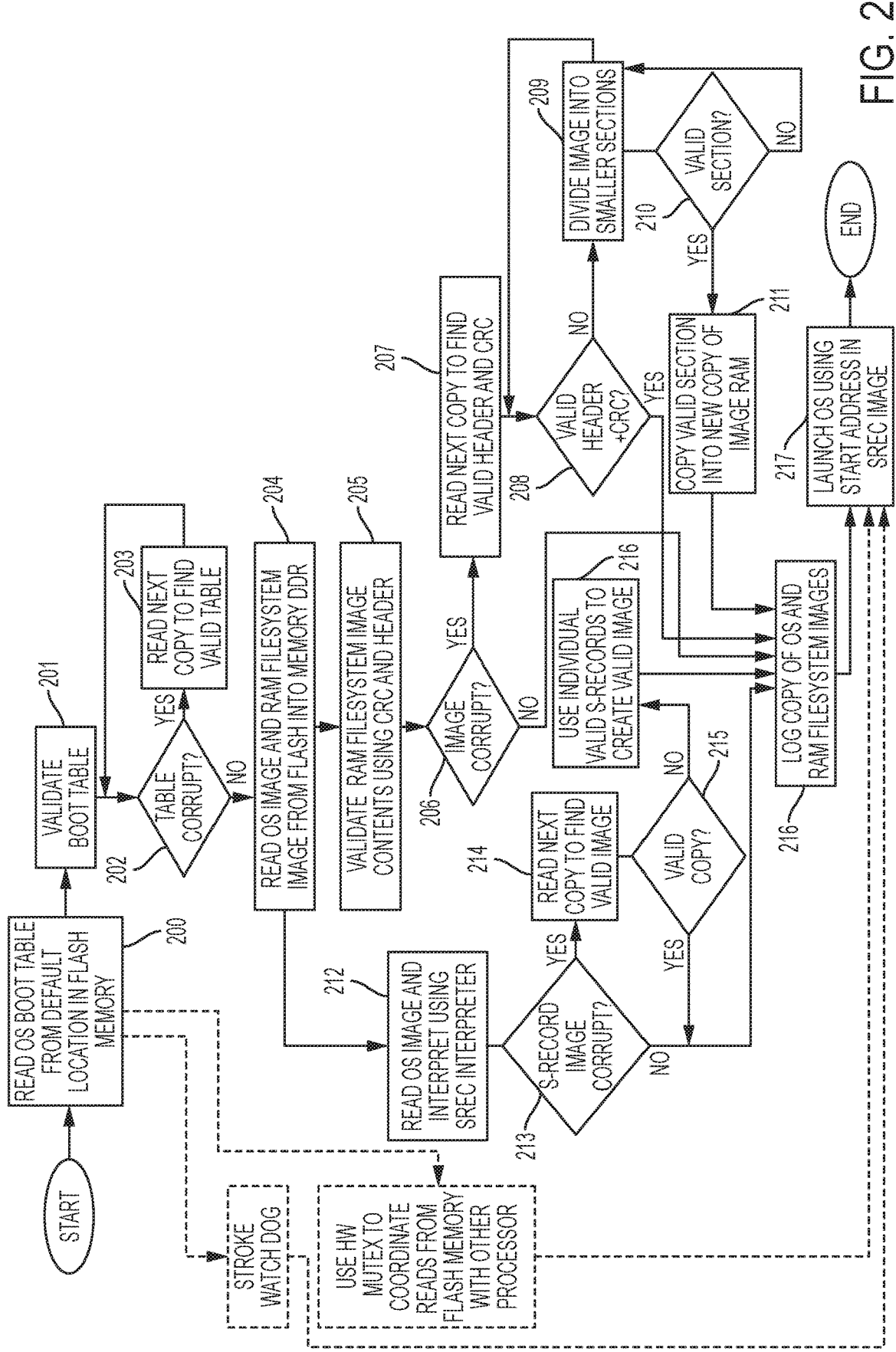
FIG. 2 is a flow chart of the steps taken to read the Restore-L software images from flash memory, using redundant copies and recovery mechanisms, to produce valid images, according to one embodiment consistent with the present invention.

In one embodiment, the process followed by the OS and DDR SRAM(s) 103 of the novel FSBL at execution time (see FIG. 2), is as follows.

In step 200, the program reads an OS boot table from a default location in flash memory 102 to the DDR SDRAM(s) 103. This boot table describes where to find the OS image and its supporting RAM filesystem image in flash memory 102. The OS lookup table is encoded with Triple Module Redundancy (TMR) using technology such as Xilinx technology or the like. Three voting copies of each byte are stored in the image.

In step 201, the program uses header information and a checksum to validate the table. The program validates its contents using a type of checksum such as a cyclic redundancy check (CRC), which utilizes a position checksum algorithm, and a header, as a way to validate that the file contents are intact.

In step 202, the boot table is checked for corruption. If the boot table is corrupt, in step 203, the program reads the next copy until it finds a valid table. Thereafter, if the boot table is not corrupt as determined in step 202, the program moves to the next step 204.

In step 204, the program locates the RAM filesystem image in flash memory 102 and it is read to the DDR SDRAM(s) 103. There can be many copies of the image in flash memory 102, and all the RAM filesystem images will be read into flash memory 102 in step 204, if necessary.

In step 205, similar to the boot table step, the RAM filesystem image is validated using header information and a CRC checksum to validate the contents.

In step 206, if one copy of the image is determined to be corrupt, the program will read the remaining copies of the image in step 207, until the program finds one with a valid header and CRC.

In step 208, if the program fails to find a valid copy, the program will divide the image into smaller sections or portions in step 209 and validate each of the smaller sections using the same header and CRC method, to find a valid copy of the section.

In step 210, the program will determine if there is a valid section. If not, the program continues dividing the image until a valid section is located.

If the program determines in step 210 that there is a valid section, then the program will copy that valid section into a new copy of the RAM filesystem image in step 211.

Meanwhile, after step 204, with respect to the OS image being read into the DDR SDRAM 103, in step 212, the program reads the OS image and interprets it using an S-record (SREC) interpreter.

In step 213, the program determines if any S-record in the image is corrupt, and if so, in step 213, the program reads the remaining copies of the S-records until it finds a fully valid copy. The program interprets each S-record individually, since each S-record contains a small piece of the OS.

If no copy is fully valid, then in step 215, the program will use individual valid S-records from multiple copies to create a fully valid image. Specifically, the program copies the valid section of the OS from the S-record into a new copy of the image at a location in memory DDR SDRAM(s) 103 defined by the S-record.

In step 216, after a fully valid image is obtained from the OS image and from the RAM filesystem image, the program logs where each copy of the OS images are stored, and where the RAM filesystem images are stored in the DDR SDRAM(s) 103, to the Spacecube 2.0™ Aeroflex's monitor FPGA 106.

In step 217, the processors' 105A-105D program moves the counter to the start of the OS, and launches the OS using the start address indicated in the SREC image.

Periodically, throughout this process, the program strokes the monitor FPGA 106 (watchdog) to indicate that the software is still alive and the processors 105A-105D are operating, otherwise, a reset is ordered.

In addition, the program also utilizes the hardware Mutex to coordinate reads from the flash memory/memories 102 by the microprocessors 105A-105D at the FPGAs 101A, 101B, as the processors 105A-105D share usage with the flash memory/memories 102.

The FSBL of the present invention is unique in that it: 1) handles two images, the OS and the RAM filesystem; 2) handles an image in a custom format (the RAM filesystem); 3) in the event all copies of an image in flash memory are corrupt, the program uses known-good sections of the image to create one fully-valid image; 4) it improves upon boot time and reliability of previous versions by adjusting when flash Mutexes are taken and released; 5) strokes a watchdog periodically; and 6) logs boot process to the Spacecube 2.0™ Aeroflex FPGA scratchpad memory.

Additional advantages of the FSBL of the present invention include: 1) the program runs out of the BRAM, and launches automatically when the FPGA is configured; 2) the flight software is stored in two pieces: the core OS (includes all of FreeRTOS and cFE) and memory file system (includes shared libraries for cFE), and the boot table has addresses to indicate where both pieces are; and 3) the Restore-L hardware/software designs require the FSBL to initialize and launch the flight software (i.e., FreeRTOS).

All the above advantages improve the underlying technology necessary to launch robotic spacecraft to refuel satellites, and its unique methods and apparatus provide a technique and efficiency not seen in the prior art.

Further, the present invention relates to space technologies including autonomous relative navigation systems with supporting avionics, and dexterous robotic arms and software, and a tool drive that supports a collection of sophisticated robotic tools for robotic spacecraft refueling, and a propellant transfer system that delivers measured amounts of fuel at the proper temperature, rate, and pressure. The space missions include a rendezvous with a client spacecraft, grasping, refueling and relocating it.

Additional applications of the present invention include on-orbit manufacturing and assembly, propellant depots, observatory servicing, orbital debris management, and asteroid redirect missions. The robotic vehicle used in an asteroid redirect mission directly leverages the present invention's autonomous rendezvous system, avionics, dexterous robotics and software, and tool drive and other systems.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method of reading software images using redundant copies and recovery mechanisms, to produce valid images, said method comprising:
   reading an operating system (OS) boot table from a default location in at least one flash memory to at least one double data rate synchronous dynamic random-access memory (DDR SDRAM) of a printed circuit board, using at least one processor connected to at least one field programmable gate array (FPGA);
   wherein said boot table describes where to find an OS image and a random-access memory (RAM) filesystem image in said at least one flash memory;
   reading a RAM filesystem image from said at least one flash memory into said DDR SDRAM; and
   validating said boot table and said RAM filesystem image by checking said boot table and said RAM filesystem image for corruption using header information and cyclic redundancy check methods;
   wherein when at least one of said OS image or said RAM filesystem image is corrupt, a valid image can be compiled using valid sections of each of said OS image or said RAM filesystem image, and
   wherein when said S-record in said OS image is corrupt, copying a valid section of said OS image from said S-record into an OS image at a location in DDR SDRAM defined by said S-record.

2. The method of claim 1, wherein when one of said boot table or said RAM filesystem image is determined to be corrupt, the method further comprising:
   reading a next copy from said at least one flash memory until a valid boot table is found.

3. The method of claim 2, the method further comprising:
   dividing said RAM filesystem image into said sections to validate each of said sections using said header information and said cyclic redundancy check methods, until a valid section is found.

4. The method of claim 3, the method further comprising:
   copying said valid section into a new copy of said RAM filesystem image.

5. The method of claim 2, the method further comprising:
   interpreting said OS image using an S-record interpreter.

6. The method of claim 5, wherein when an S-record in said OS image is corrupt, the method further comprising:
   reading remaining copies of S-records until a valid OS image is found.

7. The method of claim 6, wherein each S-record is interpreted individually.

8. The method of claim 7, wherein each S-record contains a portion of said OS image.

9. The method of claim 1, wherein when said valid image is obtained, the method further comprising:
   logging where each copy of said OS image and said RAM filesystem image are stored in said DDR SDRAM.

10. The method of claim 9, the method further comprising:
    moving a counter to a start of said operating system; and
    launching said operating system using a start address Located in said DDR SDRAM defined by said S-record.

11. The method of claim 1, the method further comprising:
    stroking a monitor FPGA to indicate that processors located with said at least one FPGA are operating; and
    ordering a reset if said processors are not operating.

12. The method of claim 1, the method further comprising:
    coordinating reads from one or more flash memories by said processors.

13. The method of claim 1, the method further comprising:
    reducing an operation voltage of said printed circuit board by using a plurality of DDR SDRAMs.

14. The method of claim 1, wherein at least one voltage regulator or Buck converter reduces said operation voltage.

15. The method of claim 1, the method further comprising:
    using internal scrubbing and error correction and detection (EDAC) methods to correct errors in processing operations of said printed circuit board.

* * * * *